(12) United States Patent
Jang (10) Patent No.: US 9,731,700 B2
(45) Date of Patent: Aug. 15, 2017

(54) SHIFT CONTROL METHOD FOR PREVENTING STARTING STAGE ENGAGEMENT FAILURE OF HYBRID ELECTRIC VEHICLE

(71) Applicant: Hyundai Motor Company, Seoul (KR)

(72) Inventor: Sang Pil Jang, Seoul (KR)

(73) Assignee: Hyundai Motor Company, Seoul (KR)

( * ) Notice: Subject to any disclaimer, the term of this patent is extended or adjusted under 35 U.S.C. 154(b) by 233 days.

(21) Appl. No.: 14/808,192

(22) Filed: Jul. 24, 2015

(65) Prior Publication Data

US 2016/0152229 A1 Jun. 2, 2016

(30) Foreign Application Priority Data

Dec. 1, 2014 (KR) .................. 10-2014-0169830

(51) Int. Cl.
| | | |
|---|---|---|
| *B60W 10/08* | (2006.01) | |
| *B60K 6/48* | (2007.10) | |
| *B60W 10/11* | (2012.01) | |
| *B60W 30/18* | (2012.01) | |
| *B60W 20/15* | (2016.01) | |
| *F16H 61/04* | (2006.01) | |

(52) U.S. Cl.
CPC .............. *B60W 10/08* (2013.01); *B60K 6/48* (2013.01); *B60W 10/11* (2013.01); *B60W 20/15* (2016.01); *B60W 30/18027* (2013.01); *B60K 2006/4825* (2013.01); *B60W 2710/081* (2013.01); *F16H 2061/047* (2013.01); *Y10S 903/902* (2013.01)

(58) Field of Classification Search
CPC .... B60W 10/026; B60W 20/15; B60W 30/19; B60W 2710/081; B60W 2061/047
See application file for complete search history.

(56) References Cited

U.S. PATENT DOCUMENTS

| | | |
|---|---|---|
| 9,057,433 B2 | 6/2015 | Sung et al. |
| 2007/0225113 A1 | 9/2007 | Ogata |
| 2012/0031230 A1* | 2/2012 | Guggolz ................ B60K 6/365 |
| | | 74/665 L |
| 2012/0055752 A1* | 3/2012 | Schneider ........... F16H 61/0403 |
| | | 192/3.63 |

FOREIGN PATENT DOCUMENTS

| | | |
|---|---|---|
| JP | 2006-70911 A | 3/2006 |
| JP | 2007-255566 A | 10/2007 |
| KR | 10-2012-0062340 A | 6/2012 |
| KR | 10-2013-0038501 A | 4/2013 |
| KR | 10-1294089 B1 | 8/2013 |
| KR | 10-2014-0077352 A | 6/2014 |

\* cited by examiner

*Primary Examiner* — Stacey Fluhart (74) *Attorney, Agent, or Firm* — Morgan Lewis & Bockius LLP (57) ABSTRACT

When a hybrid electric vehicle in which an automatic manual transmission (AMT) is equipped stops and then re-starts, when a starting stage of the AMT is not implemented, an RPM of a driving motor which is directly connected to an input shaft is changed so that a torque applied to an input shaft of the AMT is increased or decreased, and thus even though a blocking phenomenon occurs when an AMT-HEV stops and then re-starts after an engine re-starts, the torque transferred from the driving motor to the input shaft is appropriately increased and decreased and thus a gear restricted to the input shaft differently rotates from a synchronizer.

8 Claims, 8 Drawing Sheets

SHIFT CONTROL METHOD FOR PREVENTING STARTING STAGE ENGAGEMENT FAILURE OF HYBRID ELECTRIC VEHICLE

CROSS-REFERENCE TO RELATED APPLICATION

The present application is based on and claims the benefit of priority to Korean Patent Application No. 10-2014-0169830, filed on Dec. 1, 2014, the entire contents of which is incorporated herein for all purposes by this reference.

BACKGROUND OF THE INVENTION

Field of the Invention

The present disclosure relates to a shift control method for preventing a starting stage engagement failure of a hybrid electric vehicle, and more particularly, to a shift control method for preventing a starting stage engagement failure of a hybrid electric vehicle capable of solving a starting stage implementation prevention which may occur when the vehicle having a driving motor provided between an engine and a transmission stops and then starts.

Description of-Related Art

Figure 1:
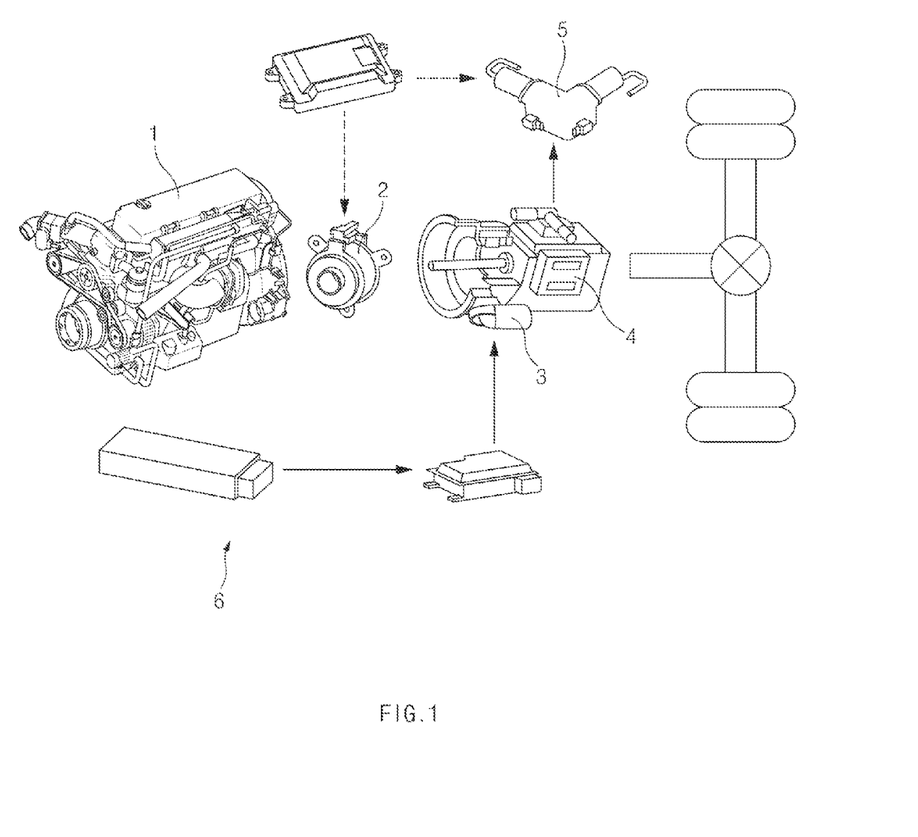
FIG. 1 is a schematic diagram of a driving system of the existing AMT-HEV.

As illustrated in FIG. 1, a hybrid driving system which is applied to a commercial hybrid electric vehicle is configured to include an engine 1, a clutch actuator 2, a driving motor 3, and automatic manual transmission (AMT) 4. The AMT 4 has a structure in which an automatic shift actuator 5 is mounted in the existing manual transmission and a clutch automatic release unit is mounted therein.

The AMT-HEV (hybrid electric vehicle in which the automatic manual transmission is mounted) 6 stops an engine at the time of stopping and re-starts the engine 1 with the driving motor 3 which is directly connected to an input shaft of the AMT 4 at the time of re-starting. To re-start the engine 1, the AMT 4 maintains a neutral state. After the engine 1 re-starts, the AMT 4 is in a starting stage state and the hybrid electric vehicle starts with power generated from the driving motor 3 as a driving force.

Figure 2:
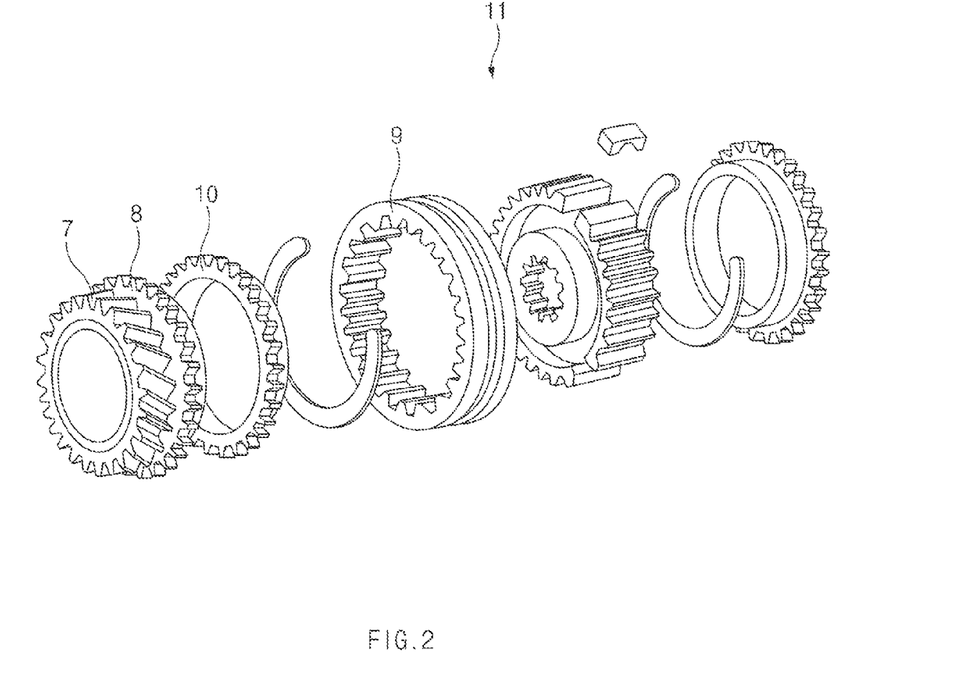
FIG. 2 is an exploded perspective view of main parts of the existing manual transmission.

However, as illustrated in FIG. 2, when the vehicle stops and then re-starts, teeth of a clutch gear 8 which are formed at a gear 7 implementing the starting stage of the AMT 4 and teeth of a synchronizer sleeve 9 form a straight line and thus the gear 7 is not engaged with the synchronizer 11 but the teeth of the clutch gear 8 collide with the teeth of the synchronizer sleeve 9, such that a blocking phenomenon that a gear engagement fails may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method for preventing a starting stage engagement failure of a hybrid electric vehicle to prevent a blocking phenomenon which may occur when an AMT-HEV stops and then starts, by controlling a driving motor.

According to an exemplary embodiment of the present disclosure, there is provided a shift control method for preventing a starting stage engagement failure of a hybrid electric vehicle, wherein when the hybrid electric vehicle in which an AMT is equipped stops and then re-starts, if the starting stage of the AMT is not implemented, an RPM of a driving motor which is directly connected to an input shaft is changed so that a torque applied to the input shaft of the AMT is increased or decreased.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present disclosure will be described in detail with reference to the accompanying drawings.

Figure 3:
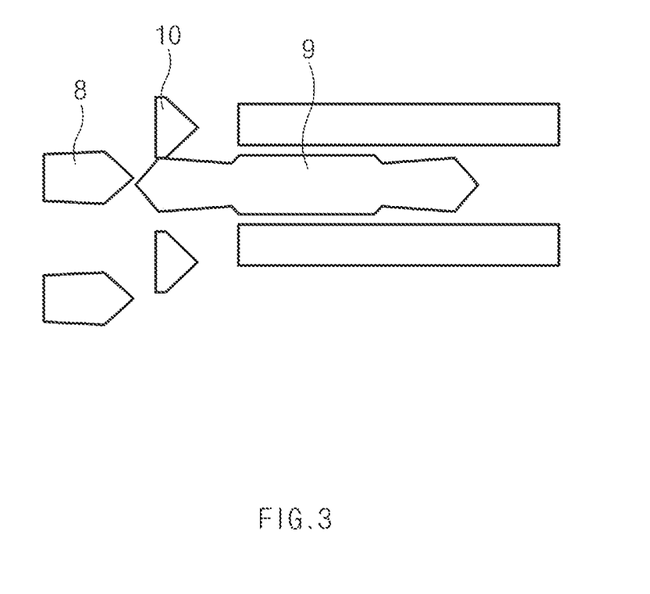
FIG. 3 is an exemplified diagram of a blocking phenomenon of the existing AMT-HEV.

As illustrated in FIGS. 2 and 3, the blocking phenomenon occurs when a synchronizer sleeve 9 is synchronized with a clutch gear 8 through a synchronizer ring 10 but teeth of a clutch gear 8 and teeth of the synchronizer sleeve 9 form a straight line and thus collide with each other.

Figure 4:
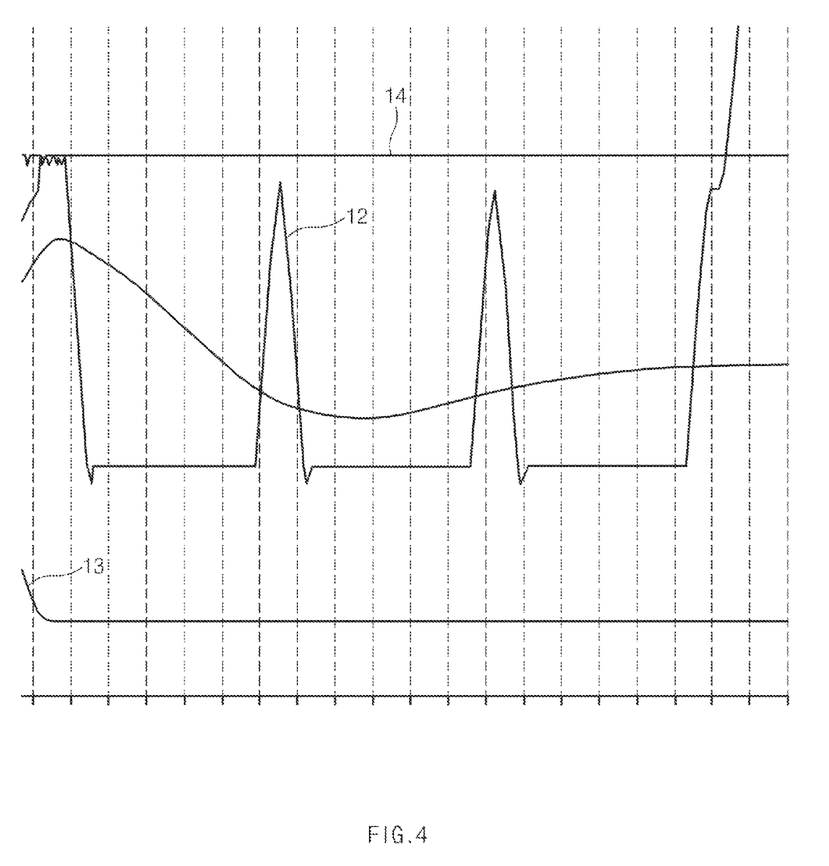
FIG. 4 is a graph illustrating a change in RPM, torque, and stroke of a driving motor at the time of the occurrence of blocking

In this case, as illustrated in FIG. 4, a moving distance of a stroke 12 of the AMT, that is, a synchronizer sleeve 9 is shorter than a normal value and the movement thereof is repeated several times to simultaneously implement the starting stage. Further, since the synchronizer sleeve 9 repeatedly contacts the driving motor 4, more accurately, the clutch gear 8 restricted to the input shaft so as to implement the starting stage, an RPM 13 of the driving motor 4 is changed without being maintained at a predetermined value.

In this case, a torque 14 transferred from the driving motor 14 to the input shaft is constantly maintained. That is, a rotation synchronization of the clutch gear 8 and the synchronizer sleeve 9 by the synchronizer ring 10 is broken and thus a torque which may more rotate any one of them is not provided.

In consideration of this, according to the exemplary embodiment of the present disclosure, when the starting stage of the AMT 4 is not implemented, the RPM of the driving motor 4 which is directly connected to the input shaft of the AMT 4 is changed so that the torque applied to the input shaft of the AMT 4 is increased or increased reversely. A more detailed description thereof will be provided below.

As illustrated in FIGS. 5 to 8, the shift control method for preventing the starting stage engagement failure of the hybrid electric vehicle according to the exemplary embodiment of the present disclosure includes operating the driving motor which is included in the hybrid electric vehicle so that the RPM is appropriate (S100), operating the automatic manual transmission (AMT) which is included in the vehicle to implement the starting stage (S200), and sensing a change in RPM of the driving motor when the starting stage is not implemented and increasing or decreasing the RPM of the driving motor depending on the change in RPM of the driving motor (S300).

Figure 5:
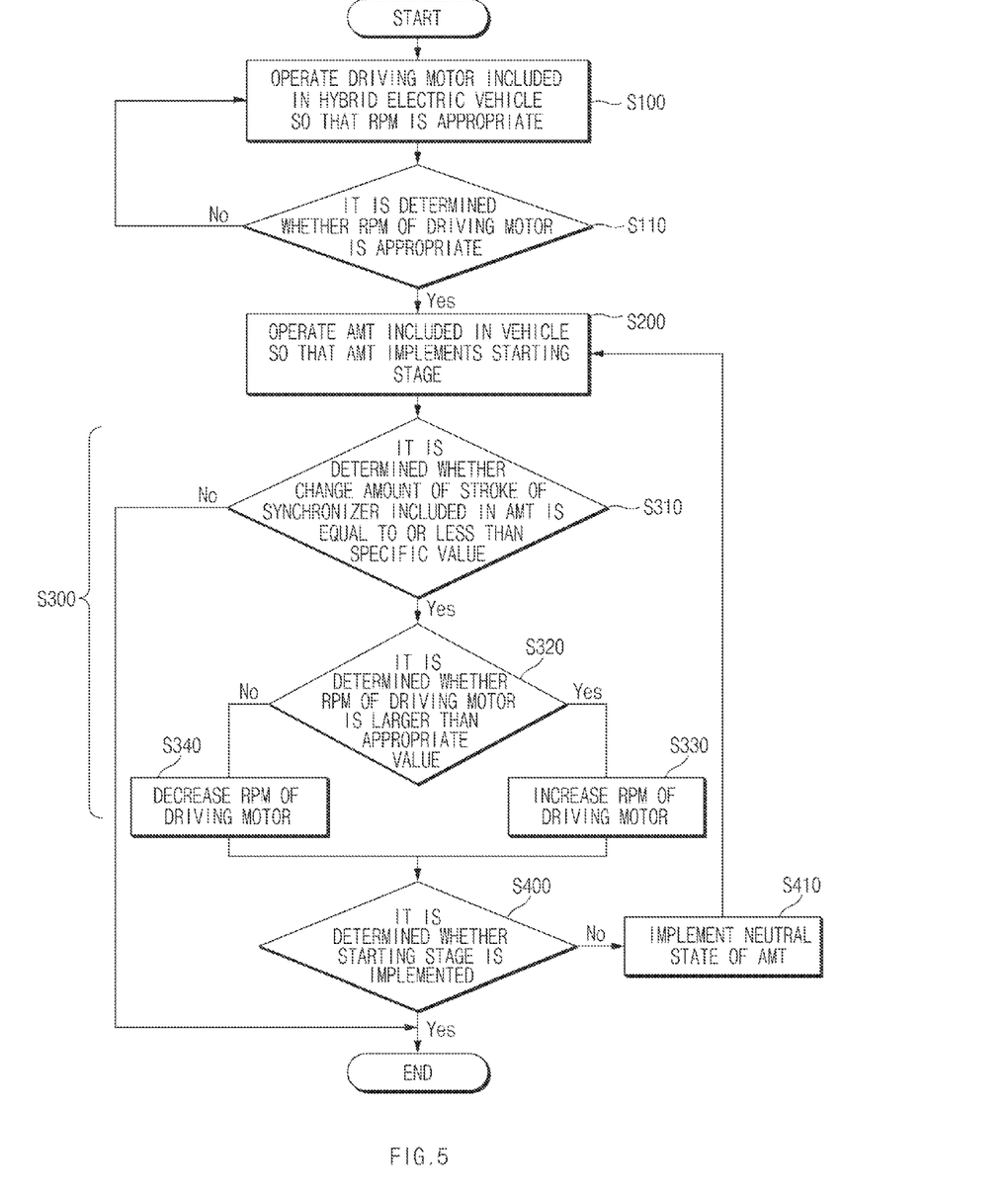
FIG. 5 is a procedure diagram of a shift control method for preventing a starting stage engagement failure of a hybrid electric vehicle according to an exemplary embodiment of the present disclosure.

It is determined whether the RPM of the driving motor is a predetermined value (S110) and if it is determined that the RPM of the driving motor is a predetermined value, the synchronizer is operated so that the AMT implements the starting stage. When a change amount in the stroke of the synchronizer included in the AMT is small, e.g., less than a predetermined amount, it is determined that the starting stage is not implemented (S310). When the starting stage is not implemented, it is determined that a synchronizer sleeve 1000 forming the synchronizer is in a series state with a clutch gear 3000 included in the AMT.

A change amount of the RPM of the driving motor from an instant when the starting stage is implemented to an instant when it is determined that the starting stage is not implemented is measured and it is determined whether the RPM is decreased or increased from the appropriate RPM (S320). If it is determined that the RPM of the driving motor is larger than the predetermined value, the RPM of the driving motor is increased (S330) and if it is determined that the RPM of the driving motor is smaller than the predetermined value, the RPM of the driving motor is decreased (S340).

After the change in the RPM of the driving motor, it is determined whether the AMT implements the starting stage (S400). When the AMT does not implement the starting stage, the AMT is operated to implement the neutral state (S410). After the AMT implements the neutral stage, the AMT is operated to implement the starting stage state.

According to the shift control method for preventing a starting stage engagement failure of a hybrid electric vehicle according to the exemplary embodiment of the present disclosure as configured as described above, as described above, when the starting stage of the AMT is not implemented, the RPM of the driving motor which is directly connected to the input shaft is changed so that the torque applied to the input shaft of the AMT is increased or increased reversely.

Figure 7:
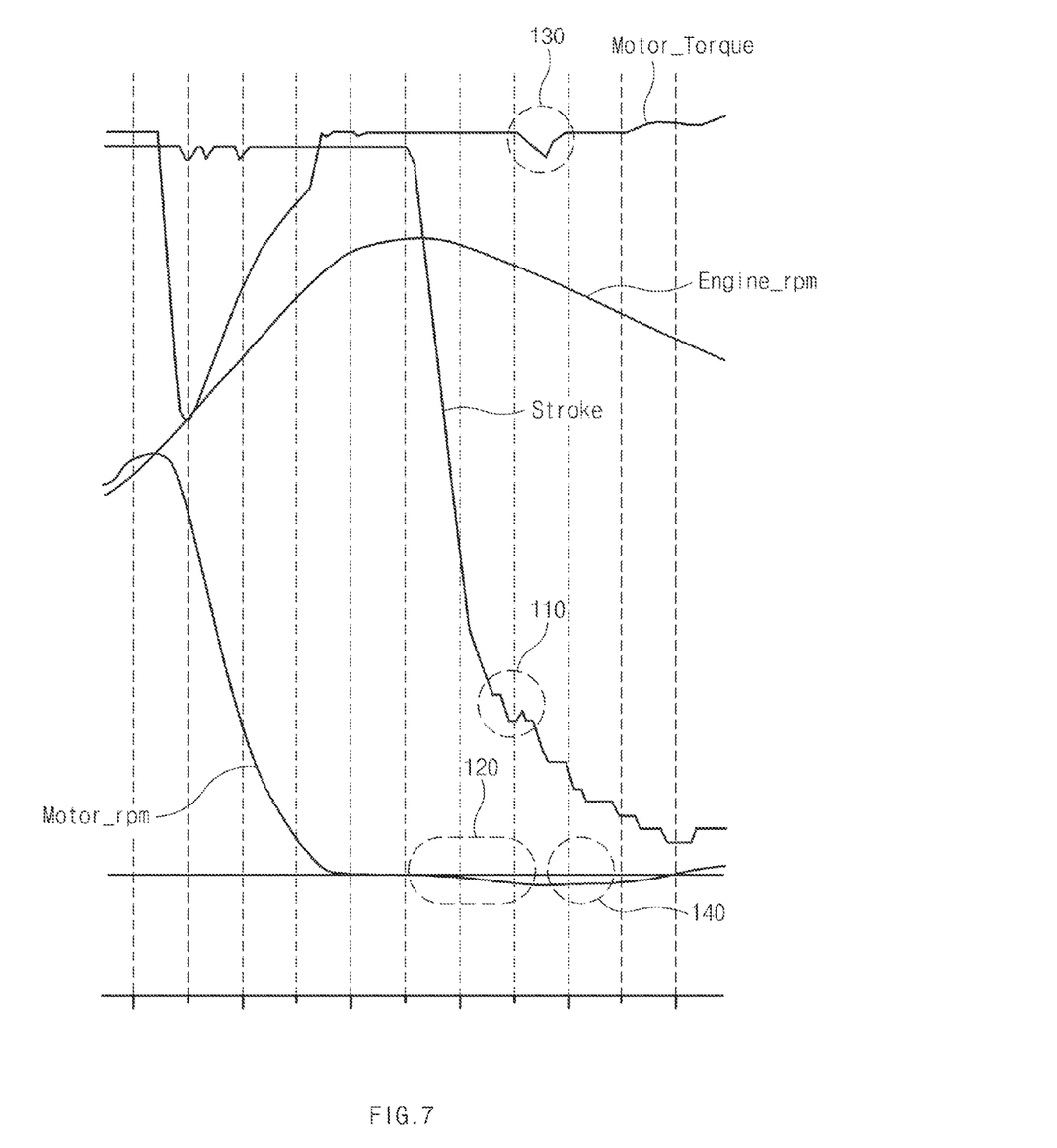
FIG. 7 is a graph illustrating the change in RPM, torque, and stroke of a driving motor in the state in which the blocking phenomenon is solved, according to the shift control method for preventing a starting stage engagement failure of a hybrid electric vehicle of FIG. 5.

As illustrated in FIG. 7, the change amount of the synchronizer sleeve 1000 is decreased (110) and thus it is determined that the starting stage of the AMT is not implemented, and at the same time, when the RPM of the driving motor is decreased (120), the driving motor decreases the RPM (140) so that the torque applied to the input shaft is decreased (130).

Figure 8:
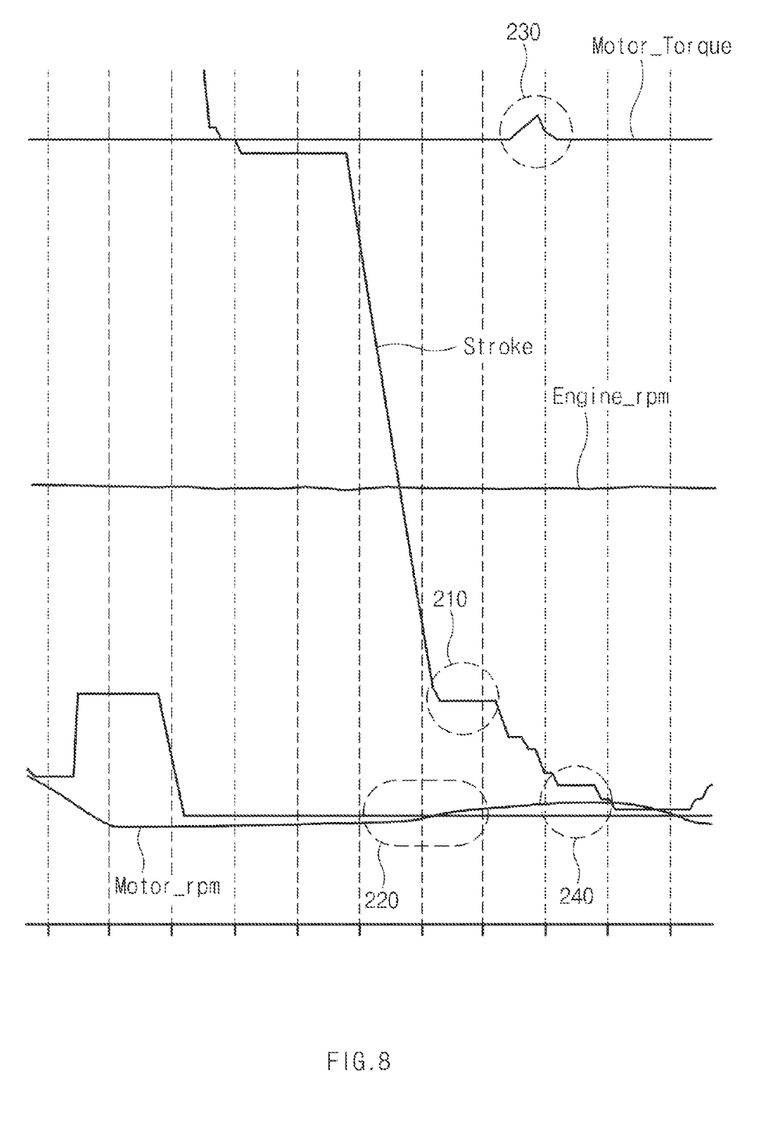
FIG. 8 is another graph illustrating a change in RPM, torque, and stroke of the driving motor in the state in which the blocking phenomenon is solved, according to the shift control method for preventing a starting stage engagement failure of a hybrid electric vehicle of FIG. 5.

Meanwhile, as illustrated in FIG. 8, the change amount of the synchronizer sleeve 1000 is decreased (210) and thus it is determined that the starting stage of the AMT is not implemented, and at the same time, when the RPM of the driving motor is increased (220), the driving motor increases the RPM (240) so that the torque applied to the input shaft is increased (230).

Figure 6:
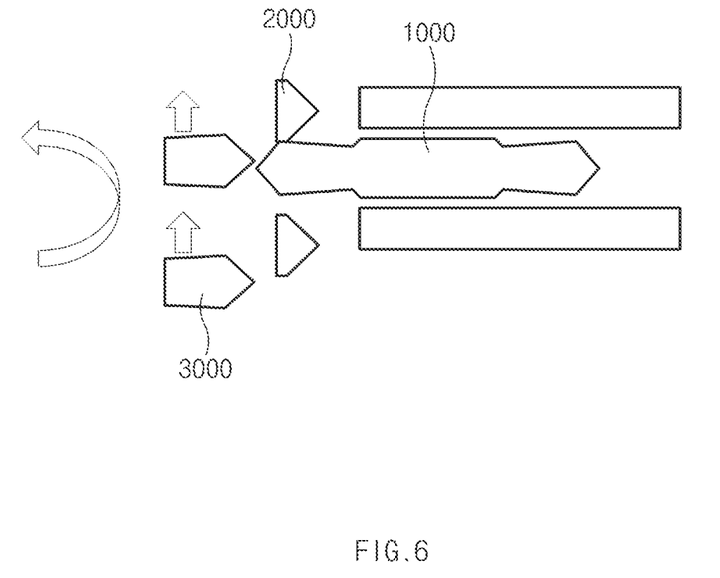
FIG. 6 is an exemplified diagram of a state in which the blocking phenomenon is solved, according to the shift control method for preventing a starting stage engagement failure of a hybrid electric vehicle of FIG. 5.

In both cases, the synchronization of the clutch gear 3000 and the synchronizer sleeve 1000 by a synchronizer ring 2000 is broken and a difference between a rotation speed of the gear restricted to the input shaft and a rotation speed of the synchronizer occurs. As a result, as illustrated in FIG. 6, the teeth of the clutch gear 3000 and the teeth of the synchronizer sleeve 1000 which form a series with each other are switched from a serial state to a non-serial state and are engaged with each other.

As described above, according to the shift control method for preventing a starting stage engagement failure of a hybrid electric vehicle according to the exemplary embodiments of the present disclosure, even though the blocking phenomenon occurs when the AMT-HEV stops and then re-starts after the engine re-starts, the torque transferred from the driving motor to the input shaft is appropriately increased and decreased and thus the gear restricted to the input shaft differently rotates from the synchronizer, such that the blocking phenomenon which occurs due to the teeth of the clutch gear formed at the gear and the teeth of the synchronizer sleeve which form a straight line may be solved.

Further, the idle stop and go (ISG) function of turning off the engine starting when the AMT-HEV stops may be unused due to the blocking phenomenon, however, according to the exemplary embodiments of the present disclosure, the blocking phenomenon is solved and therefore the use of the ISG function is expected to be increased, thereby more improving the fuel efficiency of the AMT-HEV.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for preventing an engagement failure of an engine starting state of an automatic manual transmission (ATM) of a vehicle, comprising:
    operating a driving motor which is included in the vehicle so that an RPM is controlled;
    operating the ATM which is included in the vehicle to implement the engine starting state; and
    sensing a change in the RPM of the driving motor when the starting stage is not implemented and increasing or decreasing the RPM of the driving motor depending on the change in the RPM of the driving motor wherein when the RPM of the driving motor is determined to be larger than a predetermined value, the RPM of the driving motor is increased and when the RPM of the driving motor is determined to be smaller than the predetermined value, the RPM of the driving motor is decreased.

2. The shift control method according to claim 1, wherein when a change amount in a stroke of a synchronizer included in the AMT is below a predetermined value, the engine starting state is determined to be not implemented.

3. The shift control method according to claim 2, wherein a change amount of the RPM of the driving motor from an instant when the engine starting state is implemented to an instant when the starting stage is determined to be not implemented is measured.

4. The shift control method according to claim 2, wherein when the engine starting state is not implemented, a synchronizer sleeve forming the synchronizer is determined to be in a series state with a clutch gear included in the AMT.

5. The shift control method according to claim 1, wherein when the RPM of the driving motor is a predetermined value, a synchronizer which is included in the AMT is operated so that the AMT implements the engine starting state.

6. The shift control method according to claim 1, wherein after the RPM of the driving motor is changed, when the AMT does not implement the engine starting state, the AMT is operated to implement a neutral state.

7. The shift control method according to claim 6, wherein after the AMT implements the neutral state, the AMT is operated to implement the engine starting state.

8. A shift control method for preventing an engagement failure of an engine starting state of an automatic manual transmission (AMT) of a vehicle, wherein when the vehicle in which the ATM is equipped stops and then re-starts, when the engine starting state of the AMT is not implemented, an RPM of a driving motor which is directly connected to an input shaft of the ATM is changed so that a torque applied to the input shaft of the AMT is increased or decreased wherein when the engine starting state of the ATM is not implemented, when the RPM of the driving motor is determined to be increasing, the RPM of the driving motor is increased so that the torque applied to the input shaft is increased, and wherein when the engine starting state of the ATM is not implemented, when the RPM of the driving motor is determined to be decreasing, the RPM of the driving motor is decreased so that the torque applied to the input shaft is decreased.

* * * * *